(12) United States Patent  
Iwata

(10) Patent No.: US 8,252,383 B2  
(45) Date of Patent: Aug. 28, 2012

(54) METHOD AND APPARATUS FOR EJECTING LIQUEFIED MATERIAL

(75) Inventor: Yuji Iwata, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 738 days.

(21) Appl. No.: 11/947,643

(22) Filed: Nov. 29, 2007

(65) Prior Publication Data

US 2008/0129773 A1    Jun. 5, 2008

(30) Foreign Application Priority Data

Nov. 30, 2006   (JP) .................................. 2006-323646  
Oct. 23, 2007   (JP) .................................. 2007-275460

(51) Int. Cl.  
*B41J 29/377*   (2006.01)

(52) U.S. Cl. .................. 427/421.1; 427/422; 427/427.1; 427/427.2; 427/427.3; 347/17; 347/20

(58) Field of Classification Search ............... 427/421.1, 427/422, 427.1, 427.2, 427.3; 347/17, 20  
See application file for complete search history.

(56) References Cited

U.S. PATENT DOCUMENTS

| | | | | |
|---|---|---|---|---|
| 6,286,926 B1 * | 9/2001 | Hirabayashi et al. | ............ | 347/17 |
| 6,708,279 B1 * | 3/2004 | Takenaka | ...................... | 713/324 |
| 6,914,660 B2 | 7/2005 | Onizuka et al. | | |
| 7,057,141 B1 * | 6/2006 | Moy | .............................. | 219/497 |
| 7,182,429 B2 | 2/2007 | Iwata | | |
| 2004/0145619 A1 * | 7/2004 | Nishino | .......................... | 347/17 |
| 2004/0183860 A1 * | 9/2004 | Furukawa | ....................... | 347/55 |
| 2006/0262153 A1 * | 11/2006 | Kasuga | ............................ | 347/17 |
| 2006/0284920 A1 * | 12/2006 | Iwata | .............................. | 347/19 |

FOREIGN PATENT DOCUMENTS

| | | |
|---|---|---|
| JP | 04-250055 | 9/1992 |
| JP | 09-057176 | 3/1997 |
| JP | 2003-019790 | 1/2003 |
| JP | 2003-133692 | 5/2003 |
| JP | 2003-326681 | 11/2003 |
| JP | 2004-344743 | 12/2004 |
| JP | 2004-351260 | 12/2004 |
| JP | 2007-275460 | 10/2007 |

* cited by examiner

*Primary Examiner* — Timothy Meeks  
*Assistant Examiner* — Nathan T Leong  
(74) *Attorney, Agent, or Firm* — Workman Nydegger

(57) ABSTRACT

A method for ejecting liquid crystal from a droplet ejection head onto a mother glass substrate is disclosed. The ejecting method includes: substantially equalizing the temperature in the proximity of the droplet ejection head when the droplet ejection head is held in a standby state at a standby position with the temperature in the proximity of the droplet ejection head at the time when the droplet ejection head ejects the liquid crystal onto the mother glass substrate; and moving the droplet ejection head from the standby position to a position at which the mother glass substrate is located, thereby performing ejection of the liquid crystal onto the mother glass substrate.

8 Claims, 8 Drawing Sheets

METHOD AND APPARATUS FOR EJECTING LIQUEFIED MATERIAL

CROSS-REFERENCE TO RELATED APPLICATIONS

This application is based upon and claims the benefit of priority from prior Japanese Patent Applications Nos. 2006-323646 filed on Nov. 30, 2006, and 2007-275460 filed on Oct. 23, 2007, the entire contents of which are incorporated herein by reference.

BACKGROUND

1. Technical Field

The present invention relates to a method and an apparatus for ejecting liquefied material.

2. Related Art

As a replacement of conventional injection methods, a method that employs a droplet ejection apparatus has been known, which apparatus ejects droplets of liquid crystal material into a space defined by a seal material on a glass substrate before bonding of the glass substrate has been known.

This type of droplet ejection apparatus includes a mother glass substrate mounted on a stage, a droplet ejection head through which liquid crystal in the form of droplets is ejected into respective cells formed on the mother glass substrate in a matrix-like manner, and a mechanism that moves the mother glass substrate and the droplet ejection head relative to each other in a two-dimensional manner. Specifically, a predetermined amount of liquid crystal in the form of a droplet is ejected from the droplet ejection head and received in a rectangular frame-like seal member arranged in each of the cells. In such ejection, the amounts of the liquid crystal received in the cells must be all equal. The mother glass substrate and an opposing substrate are bonded together and subsequently cut apart into pieces in correspondence with the cells. In this manner, a plurality of liquid crystal panels are manufactured.

The liquid crystal exhibits high viscosity at normal temperature. Thus, if the liquid crystal is ejected from the droplet ejection head at normal temperature, the weight of the liquid crystal ejected cannot be uniform for each of cycles of ejection. In this case, the amounts of the liquid crystal ejected into the respective cells become nonuniform. Depending on the type of the liquid crystal, clogging may occur in the droplet ejection head. Japanese Laid-Open Patent Publication No. 2003-19790 discloses a droplet ejection apparatus having a heating member that heats liquid crystal supplied to a droplet ejection head. Such heating lowers the viscosity of the liquid crystal and thus the droplet ejection apparatus ejects the liquid crystal with a lowered viscosity. Operation of the heating member is controlled by a controller in such a manner that the liquid crystal in the droplet ejection head is constantly maintained at a predetermined temperature.

However, if the liquid crystal is ejected onto the cells on the mother glass substrate after the liquid ejection head is moved from a standby position spaced from the mother glass substrate to a predetermined position above the mother glass substrate, the liquid crystal is ejected onto the cells by decreased amounts at an early stage of ejection, compared to the liquid crystal ejected at later stages of the ejection.

Specifically, the temperature of the liquid crystal in the droplet ejection head is adjusted in correspondence with the temperature in the proximity of the ejection head so as to be maintained at a predetermined temperature. Since temperature changes in the proximity of the standby position changes are small, the longer the time in which the droplet ejection head is held at the standby position, the more stable the temperature of the liquid crystal in the droplet ejection head becomes.

However, the atmosphere in which the liquid ejection head is located at the standby position is different from the atmosphere in which the liquid ejection head is arranged on the mother glass substrate. Thus, the temperature of the droplet ejection head is lowered by the time ejection of the liquid crystal is started after the droplet ejection head has been moved from the standby position to the position above the mother glass substrate. That is, heat balance in the droplet ejection head and the proximity of the droplet ejection head is maintained in a stable state as long as the droplet ejection head is held at the standby position. However, as the droplet ejection head is moved to the position above the mother glass substrate, the heat balance in the droplet ejection head and the proximity of the droplet ejection head abruptly and greatly changes. If the droplet ejection head is maintained above the mother glass substrate for a long time, the heat balance in the droplet ejection head and the proximity of the droplet ejection head becomes stabilized. Thus, the temperature in the droplet ejection head is adjusted stably on the mother glass substrate. However, at the aforementioned early stage of the ejection, great change of the viscosity of the liquid crystal is caused by the abrupt change of the heat balance. This decreases the amount of the liquid crystal supplied to each of the corresponding cells at the early stage.

Further, since the nozzle plate of the droplet ejection head is formed by an extremely thin metal plate, heat produced by the liquid crystal in the droplet ejection head is easily dissipated through the nozzle plate. This further decreases the amount of the liquid crystal supplied to each of the corresponding cells at the early stage of the ejection.

SUMMARY

Accordingly, it is an objective of the present invention to provide a method and an apparatus for ejecting liquefied material that allow droplets to be supplied to a substrate by uniform amounts.

To achieve the foregoing objectives and in accordance with a first aspect of the present invention, a method for ejecting a liquefied material from an ejection member onto a substrate is provided. The method includes: substantially equalizing a temperature in a proximity of the ejection member when the ejection member is held in a standby state at a standby position with the temperature in the proximity of the ejection member at the time when the ejection member ejects the liquefied material onto the substrate; and moving the ejection member from the standby position to a position at which the substrate is located, thereby performing ejection of the liquefied material onto the substrate.

In accordance with a second aspect of the present invention, an ejection apparatus that ejects a liquefied material from an ejection member onto a substrate is provided. The apparatus includes a standby stage and a control section. The standby stage is arranged at a position below a standby position at which the ejection member is held in a standby state. The control section is provided in the standby stage. The control section adjusts the temperature in the proximity of the standby stage to a temperature substantially equal to the temperature in the proximity of the ejection member at the time when the ejection member ejects the liquefied material onto the substrate.

In accordance with a third aspect of the present invention, an apparatus for ejecting a liquefied material from an ejection member onto a substrate is provided. The apparatus includes a first temperature detector, a first temperature regulating section, a standby stage, a second temperature detector, and a second temperature regulating section. The first temperature detector outputs a detection signal representing a temperature of the liquefied material in the ejection member. The first temperature regulating section adjusts the temperature of the liquefied material in the ejection member to a first target temperature in correspondence with the detection signal provided by the first temperature detector. The standby stage is arranged below a standby position at which the ejection member is held in a standby state. The second temperature detector outputs a detection signal representing a temperature in a proximity of the standby stage. The second temperature regulating section adjusts the temperature in the proximity of the standby stage to a second target temperature in correspondence with the detection signal provided by the second temperature detector.

In accordance with a fourth aspect of the present invention, an ejection apparatus that ejects a liquefied material from an ejection member onto a substrate is provided. The apparatus includes a transport stage, a third temperature regulating section, a standby stage, and a fourth temperature regulating section. The transport stage moves the substrate relative to the ejection member. The third temperature regulating section is arranged in the transport stage. The third temperature regulating section heats the substrate to a third target temperature. The standby stage is arranged at a position below a standby position at which the ejection member is held in a standby state. The fourth temperature regulating section is arranged in the standby stage. The fourth temperature regulating section adjusts the temperature in the proximity of the standby stage to a fourth target temperature substantially equal to the temperature in the proximity of the ejection member at the time when the ejection member ejects the liquefied material onto the substrate.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

A first embodiment of the present invention will now be described with reference to the attached drawings.

Figure 1:
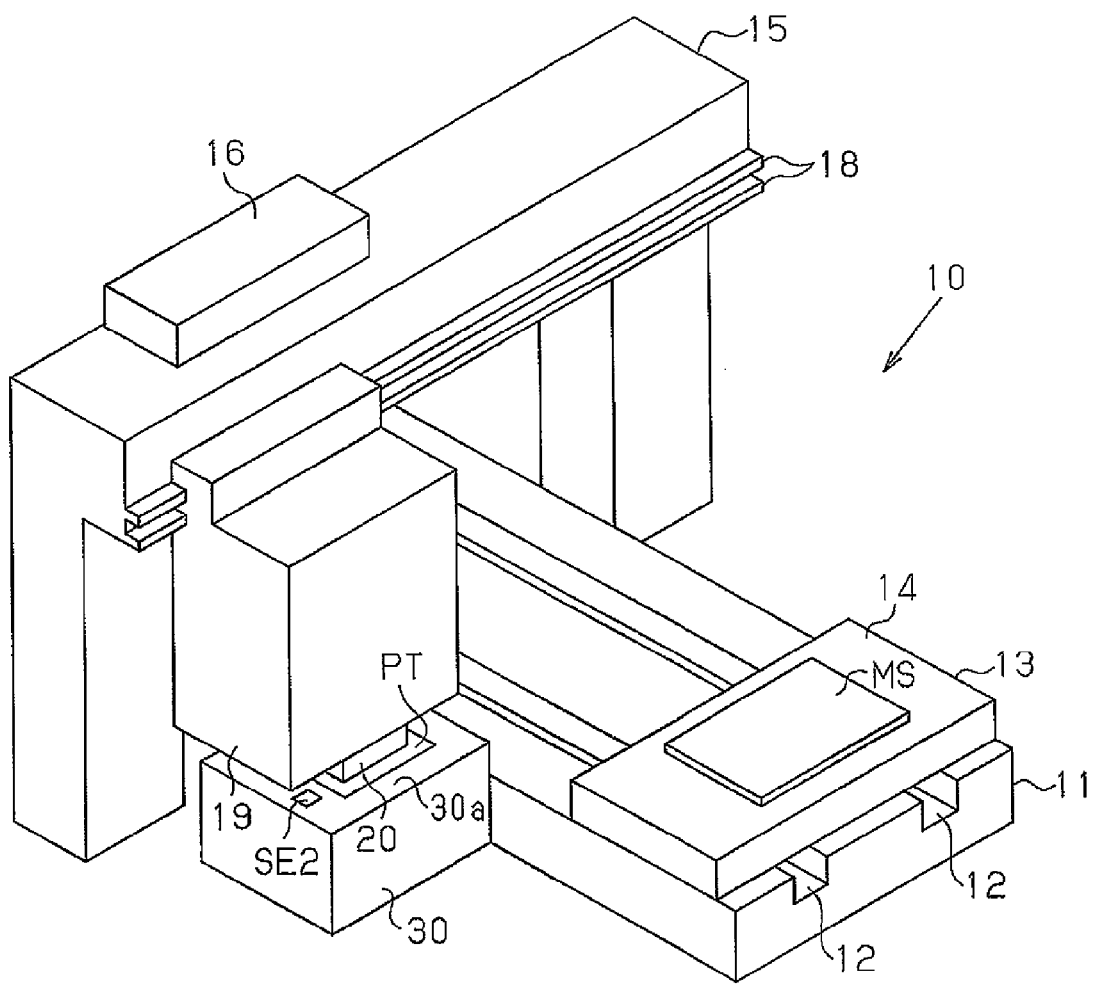
FIG. 1 is a perspective view showing a droplet ejection apparatus according to a first embodiment of the present invention.

As shown in FIG. 1, a droplet ejection apparatus 10 has a base 11 shaped like a rectangular parallelepiped. A pair of guide grooves 12, which extend in the longitudinal direction of the base 11, or a y-direction, are defined in the top surface of the base 11. A stage 13, which moves along the guide grooves 12, or in the main scanning direction (the Y direction in FIG. 1), is provided on the base 11. The top surface of the stage 13 functions as a mounting portion 14 and a mother glass substrate MS, or a mother substrate, is mounted on the mounting portion 14.

Figure 2:
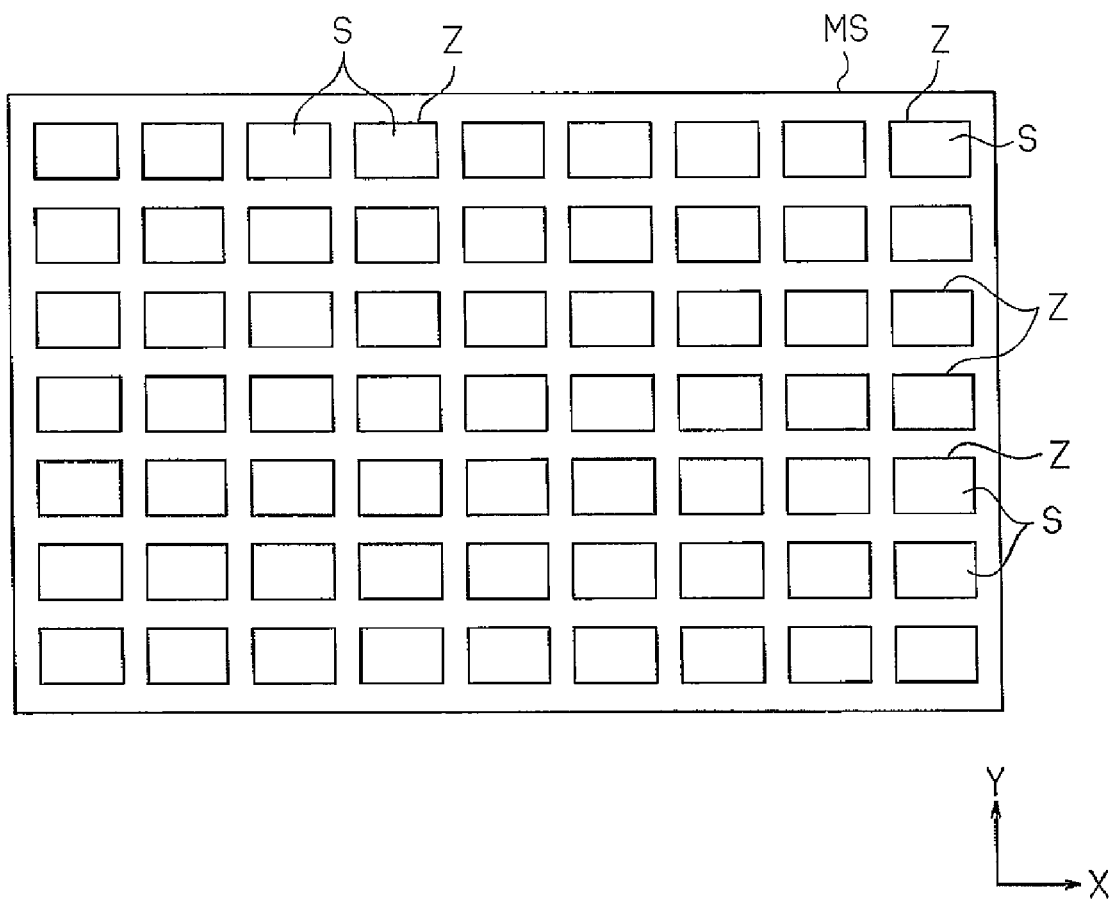
FIG. 2 is a plan view showing a mother glass substrate.

The mounting portion 14 positions the mother glass substrate MS with respect to the stage 13 and fixes the mother glass substrate MS to the stage 13. The stage 13 transports the mother glass substrate MS in the Y direction and the opposite direction to the Y direction. The mother glass substrate MS is a single large-sized glass substrate from which a plurality of liquid crystal panels (cells S), which are to be bonded with opposing substrates, are obtained through cutting. With reference to FIG. 2, in the illustrated embodiment, sixty-three (7×9) liquid crystal panels (cells S) are provided from the mother glass substrate MS.

As illustrated in FIG. 2, the mother glass substrate MS includes areas (hereinafter, referred to as ejection areas) Z in which the cells S are formed and areas (hereinafter, referred to as non-ejection areas) free of the cells S. Each of the ejection areas Z is surrounded by a seal member and defined in a rectangular shape.

In the following description, the longitudinal direction of the mother glass substrate MS will be referred to as the Y direction and the lateral direction of the mother glass substrate MS will be referred to as an X direction for the illustrative purposes.

A gate-like guide member 15 extends over the base 11 in the sub-scanning direction perpendicular to the main scanning direction, or the X direction. A tank 16, which extends in the X direction, is mounted on the guide member 15. The tank 16 retains liquid crystal F (see FIG. 4) as a liquefied material.

A pair of upper and lower guide rails 18 are formed along the guide member 15 along the full length of the guide member 15 in the X direction. A carriage 19 is secured to the guide rails 18. The carriage 19 is movable along the guide rails 18 in the X direction and the opposite direction to the X direction. A droplet ejection head 20, or an ejection member, is carried by the carriage 19. The ejection head 20 and the tank 16 are connected to each other through a supply tube T shown in FIG. 4. The liquid crystal F in the tank 16 is supplied to the ejection head 20 through the supply tube T under a predetermined level of pressure.

Figure 3:
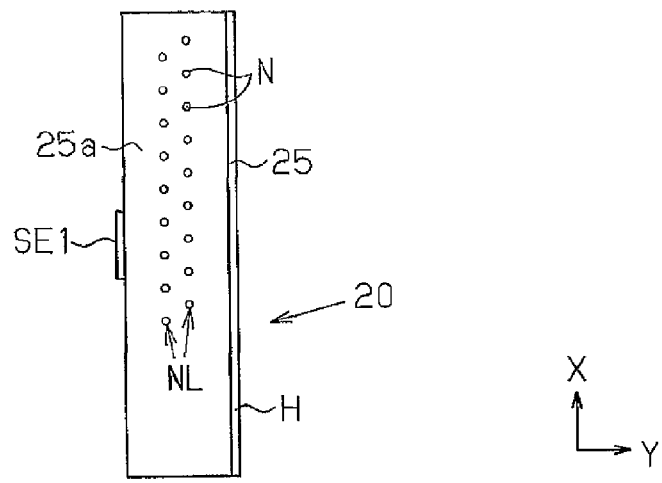
FIG. 3 is a view showing a droplet ejection head of the ejection apparatus shown in FIG. 1, as viewed from the side corresponding to the mother glass substrate.

As shown in FIG. 3, the ejection head 20 has a nozzle plate 25 formed on the surface of the ejection head 20 facing the mother glass substrate MS. A pair of nozzle rows NL, which are arranged in a zigzag manner as a whole, are formed on a nozzle forming surface 25a of the nozzle plate 25. Nozzles N of one of the nozzle rows NL are each arranged between a corresponding adjacent pair of nozzles N of the other nozzle row NL in the X direction. In the illustrated embodiment, the ejection head 20 has 360 (180×2) nozzles N per inch in the X direction. In other words, the maximum resolution of the ejection head 20 of the embodiment is 360 dpi.

Figure 4:
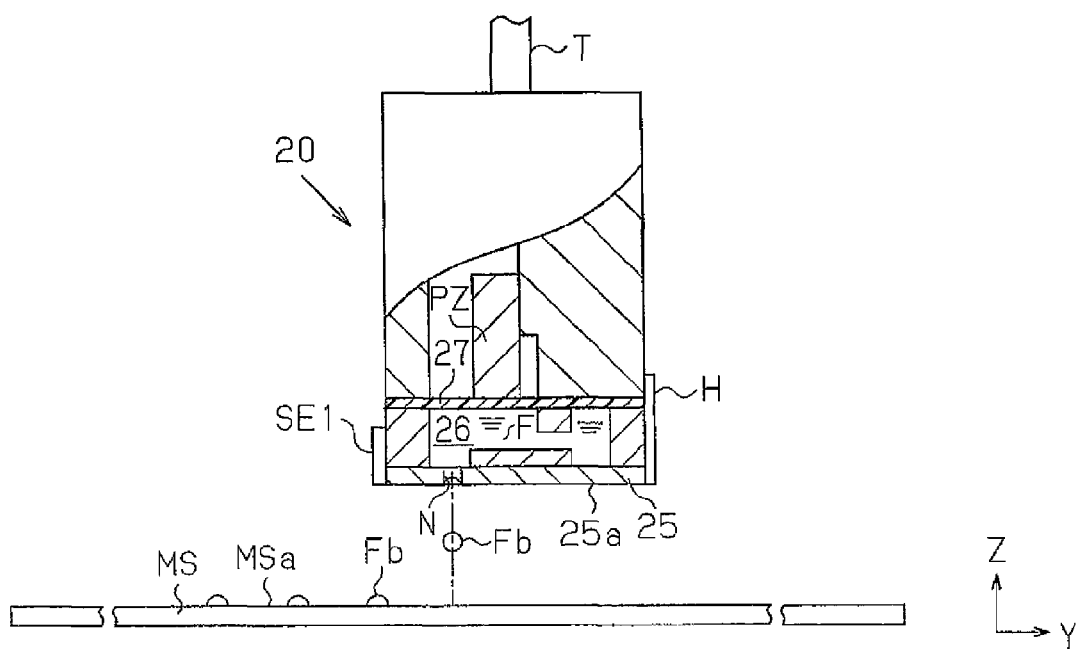
FIG. 4 is a partial cross-sectional side view showing the droplet ejection head shown in FIG. 3.

As illustrated in FIG. 4, the ejection head 20 has cavities 26, which are defined above the nozzles N of the nozzle plate 25 and communicate with the supply tube T. The cavities 26 receive the liquid crystal F from the supply tube T and supply the liquid crystal F to the corresponding nozzles N. An oscillation plate 27 is provided above each of the respective cavities 26. A piezoelectric element PZ is arranged on each of the oscillation plates 27 in correspondence with the associated one of the nozzles N. The piezoelectric elements PZ contract and extend in a vertical direction and thus oscillate the associated oscillation plates 27 in the vertical direction (a Z direction and the opposite direction to the Z direction). This increases and decreases the volume of each cavity 26, thus applying pressure to the liquid crystal F in the cavity 26. The associated oscillation plate 27 thus forms a droplet Fb of the liquid crystal F with a predetermined size and ejects the droplet Fb from the corresponding nozzle N. Specifically, the droplet Fb is ejected from the nozzle N onto an ejection target surface MSa of the mother glass substrate MS, which is located immediately below the ejection head 20, as the droplet Fb. The droplet Fb is thus adhered to the ejection target surface MSa. In other words, when the mother glass substrate MS moves in the main scanning direction along a path immediately below the ejection head 20, droplets Fb are ejected sequentially from the ejection head 20 onto corresponding ones of the cells S on the mother glass substrate MS.

A rubber heater H, which functions as a first temperature regulating section, is secured to the side surface of the ejection head 20 facing the Y direction. The rubber heater H heats the liquid crystal F in the cavities 26 to a predetermined first target temperature. The first target temperature is the temperature of the liquid crystal F at which the viscosity of the liquid crystal F allows the ejection head 20 to eject the liquid crystal F as droplets Fb. In the illustrated embodiment, the first target temperature is 70° C. A first temperature sensor SE1 is secured to the side surface of the ejection head H opposed to the rubber heater H as a first temperature detector. The first temperature sensor SE1 detects the temperature of the liquid crystal F received in the cavities 26.

Figure 5:
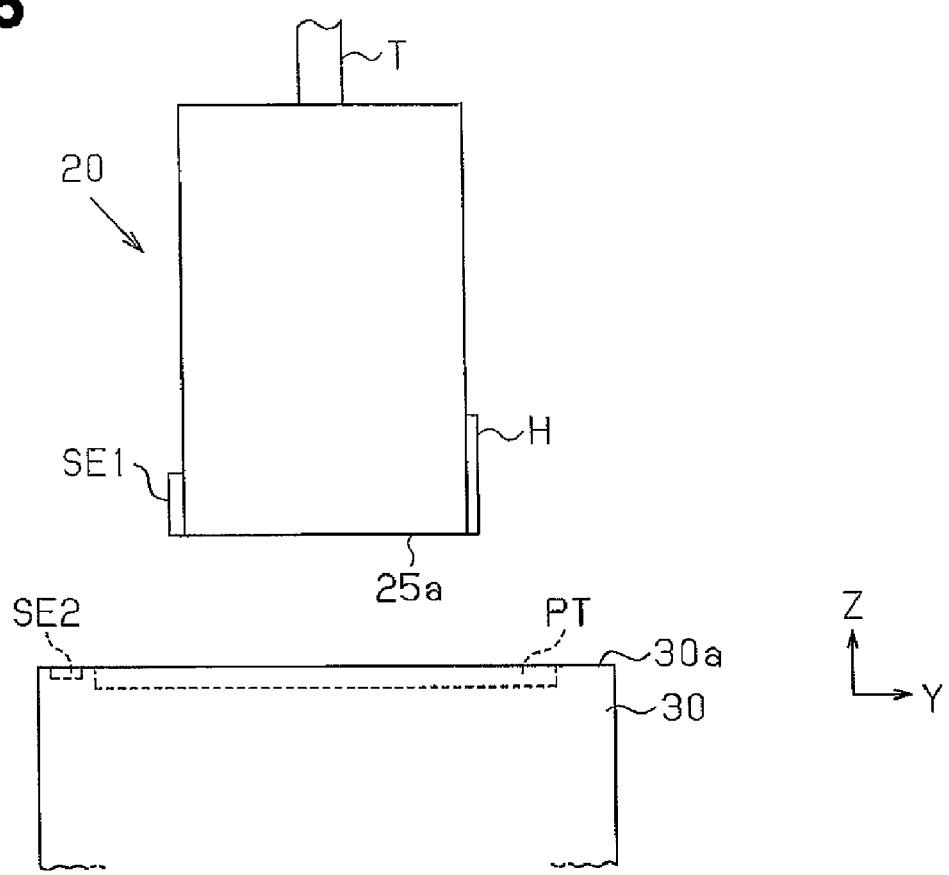
FIG. 5 is a diagram showing the relative positions of the droplet ejection head shown in FIG. 3 and a standby stage.

Further, with reference to FIG. 1, the droplet ejection apparatus 10 has a standby stage 30 at a position rearward from the stage 13 in the X direction. A top surface 30a of the standby stage 30 has a rectangular shape. The standby stage 30 is arranged in such a manner that the standby stage 30 is allowed to oppose the ejection head 20. The position of the ejection head 20 opposed to the standby stage 30 is referred to as a standby position. As illustrated in FIG. 5, a recess is formed in the top surface 30a of the standby stage 30. A Pettier element PT, which functions as a second temperature regulating section, is received in the recess in a state flush with the top surface 30a. The position of the standby stage 30 is adjusted in such a manner that the interval between the nozzle plate 25 (the nozzle forming surface 25a) of the ejection head 20 and the top surface 30a (the Pettier element PT) of the standby stage 30 is equal to the interval between the nozzle plate 25 (the nozzle forming surface 25a) and the mother glass substrate MS (the ejection target surface MSa) mounted on the stage 13.

The Pettier element PT regulates the state of the temperature in the ejection head 20 and the proximity of the ejection head 20 through adjustment of the temperature in the proximity of the standby stage 30 when the ejection head 20 is arranged at the standby position. Specifically, the Pettier element PT operates in such a manner that the temperature in the proximity of the standby stage 30 becomes a predetermined temperature (a second target temperature). The second target temperature is set to a level that allows the state of the temperature in the ejection head 20 and the proximity of the ejection head 20 when the ejection head 20 is arranged at the standby position to be equivalent with the state of the temperature in the ejection head 20 and the proximity of the ejection head 20 when the ejection head 20 sequentially ejects the droplets Fb onto the cells S of the mother glass substrate MS. The second target temperature is determined through experiments, tests, or calculations.

A second temperature sensor SE2, or a second temperature detector, is provided on the top surface 30a of the standby stage 30. The second temperature sensor SE2 detects the temperature in the proximity of the standby stage 30 (in other words, the standby position), which is the temperature in the proximity of the ejection head 20 when the ejection head 20 is arranged at the standby position.

The electric configuration of the droplet ejection apparatus 10 will be explained with reference to FIG. 6.

Figure 6:
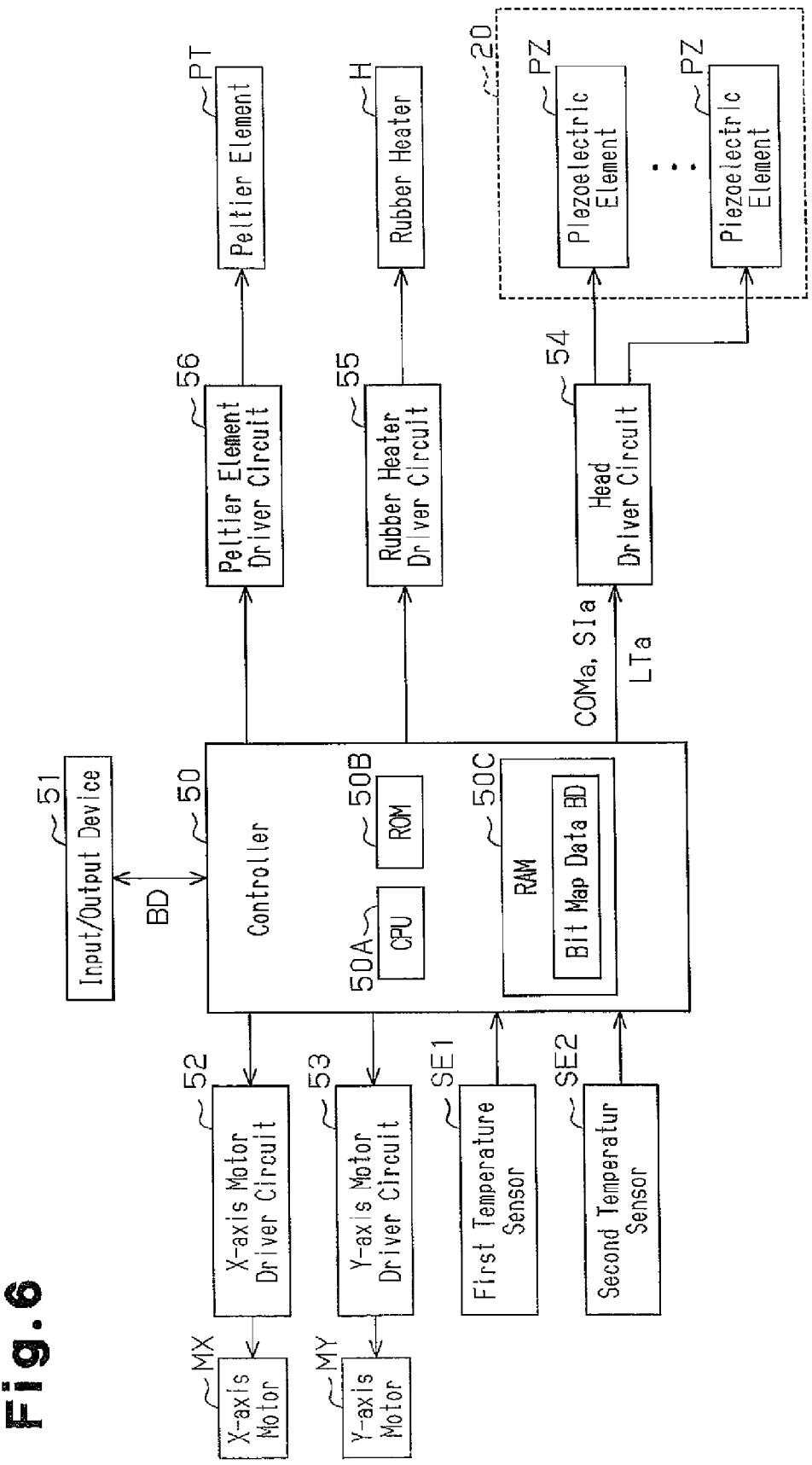
FIG. 6 is a block circuit diagram representing the electric configuration of the droplet ejection apparatus shown in FIG. 1.

With reference to FIG. 6, a controller 50 serving as a first temperature regulating section and a second temperature regulating section includes a CPU 50A, a RON 50B, and a RAM 50C. The controller 50 executes a transport procedure of the stage 13, a transport procedure of the carriage 19, and a droplet ejection procedure of the ejection head 20 in accordance with various types of data and control programs stored in the ROM 50B and the RAM 50C. The controller 50 controls operation of the rubber heater H and operation of the Peltier element PT.

An input/output device 51 having different types of manipulation switches and a display is connected to the controller 50. The input/output device 51 displays the states of the procedures carried out by the droplet ejection apparatus 10. The input/output device 51 generates bit map data BD in accordance with which a pattern is formed by the droplets Fb on the mother glass substrate MS and outputs the bit map data BD to the controller 50.

The bit map data BD is data used for instructing to turn on or off the respective piezoelectric elements PZ in correspondence with the associated bit values (0 or 1). Tn accordance with the bit map data BD, it is determined whether to eject a droplet Fb onto a respective one of positions on an ejection plane (the ejection target surface MSa) over which the ejection head 20 passes (the nozzles N pass). In other words, the bit map data BD is data that ensures ejection of droplets FB onto target positions defined on the ejection target surface MSa.

In the illustrated embodiment, with reference to FIG. 2, the bit map data BD is data that represents a plurality of target receiving positions of droplets Fb in the ejection areas Z so that the liquid crystal F is supplied to the ejection areas Z on the mother glass substrate MS all by predetermined equal amounts.

An X-axis motor driver circuit 52 is connected to the controller 50. The controller 50 provides a drive control signal to the X-axis motor driver circuit 52. In response to the drive control signal from the controller 50, the X-axis motor driver circuit 52 operates to rotate an X-axis motor MX, which drives the carriage 19, in a forward direction or a reverse direction. A Y-axis motor driver circuit 53 is connected to the controller 50. The controller 50 provides a drive control signal to the Y-axis motor driver circuit 53. In response to the drive control signal from the controller 50, the Y-axis motor driver circuit 53 operates to rotate a Y-axis motor MY, which drives the stage 13, in a forward direction or a reverse direction.

A head driver circuit 54 is connected to the controller 50. The controller 50 outputs an ejection timing signal LTa synchronized with a predetermined ejection frequency to the head driver circuit 54. The controller 50 also provides drive voltage COMa that drives the piezoelectric elements PZ to the head driver circuit 54 synchronously with the ejection frequency.

The controller 50 generates pattern forming control signals SIa synchronized with a predetermined frequency in accordance with the bit map data BD and serially transfers the pattern forming control signals SIa to the head driver circuit 54. The head driver circuit 54 sequentially converts the pattern forming control signals SIa, which have been provided by the controller 50, from serial forms to parallel forms in correspondence with the piezoelectric elements PZ. Further, the head driver circuit 54 latches the pattern forming control signals SIa that have been converted into the parallel forms each time the head driver circuit 54 receives the ejection timing signal LTa from the controller 50. The head driver circuit 54 thus supplies the drive voltage COMa to those of the piezoelectric elements PZ that are selected in correspondence with the pattern forming control signals SIa.

A rubber heater driver circuit 55, which functions as a part of the first temperature regulating section, is connected to the controller 50. The controller 50 outputs a drive control signal to the rubber heater driver circuit 55. In response to the drive control signal from the controller 50, the rubber heater driver circuit 55 controls operation of the rubber heater H. The rubber heater H heats the liquid crystal F in the ejection head 20 to a predetermined target temperature. In other words, the liquid crystal F supplied to the ejection head 20 is heated by the rubber heater H to the target temperature, which is, in the illustrated embodiment, 70° C.

A Peltier element driver circuit 56, which functions as a part of the second temperature regulating section, is connected to the controller 50. The controller 50 sends a drive control signal to the Peltier element driver circuit 56. In response to the drive control signal from the controller 50, the Peltier element driver circuit 56 controls operation of the Peltier element PT.

The Peltier element PT adjusts the temperature in the proximity of the standby stage 30 to the second target temperature. That is, the controller 50 controls operation of the Peltier element PT in such a manner that the temperature in the proximity of the standby stage 30 (in other words, the temperature in the proximity of the ejection head 20 located at the standby position) becomes the second target temperature.

The first temperature sensor SE1 is connected to the controller 50. The controller 50 receives a detection signal from the first temperature sensor SE1 and thus obtains the current value of the temperature of the liquid crystal F in the ejection head 20. The controller 50 then compares the obtained temperature of the liquid crystal F with the first predetermined target temperature. The controller 50 thus controls operation of the rubber heater H through the rubber heater driver circuit 55 in such a manner that the temperature of the liquid crystal F becomes the first target temperature.

The second temperature sensor SE2 is connected to the controller 50. The controller 50 receives a detection signal from the second temperature sensor SE2 and thus obtains the current value of the temperature in the proximity of the standby stage 30, or the temperature in the proximity of the ejection head 20 arranged at the standby position. The controller 50 then compares the obtained temperature in the proximity of the standby stage 30 with the second target temperature. The controller 50 thus controls operation of the Peltier element PT through the Peltier element driver circuit 56 in such a manner that the temperature in the proximity of the standby stage 30 becomes the second target temperature.

Next, a method for supplying a predetermined amount of liquid crystal F to each of the cells S on the mother glass substrate MS using the droplet ejection apparatus 10 will be explained.

As illustrated in FIG. 1, the ejection head 20 is held in a standby state at the standby position. In this state, the controller 50 receives the detection signal from the first temperature sensor SE1 and controls operation of the rubber heater H through the rubber heater driver circuit 55 in such a manner that the temperature of the liquid crystal F in the ejection head 20 becomes the first target temperature (70° C.). Further, the controller 50 receives the detection signal from the second temperature sensor SE2 and controls operation of the Peltier element PT through the Peltier element driver circuit 56 in such a manner that the temperature in the proximity of the standby stage 30 becomes the second target temperature.

In this manner, the state of the temperature in the ejection head 20 and the proximity of the ejection head 20 when the ejection head 20 is located at the standby position becomes equivalent with such state of the temperature at the time when the ejection head 20 sequentially ejects the droplets Fb onto the cells S on the mother glass substrate MS.

As a result, the heat balance in the ejection head 20 and the proximity of the ejection head 20 when the ejection head 20 is held in the standby state becomes equal to the heat balance at the time when the ejection head 20 ejects the droplets Fb onto the cells S on the mother glass substrate MS. In other words, even at the standby position, the rubber heater driver circuit 55 heats the rubber heater H by the output (the power) equal to the power produced by the rubber heater driver circuit 55 when the droplets Fb are ejected onto the cells S on the mother glass substrate MS, in such a manner that the temperature of the rubber heater H becomes the first target temperature.

The bit map data 3D is input to the controller 50 through the input/output device 51. In other words, the controller 50 stores the bit map data BD provided through the input/output device 51.

Subsequently, the mother glass substrate MS is mounted on the stage 13. At this stage, as illustrated in FIG. 1, the stage 13 is arranged rearward from the carriage 19 in the Y direction. The input/output device 51 outputs a signal instructing the controller 50 to start its operation.

The controller 50 then drives the X-axis motor MX through the X-axis motor driver circuit 52 to move the ejection head 20 from the standby position in the X direction. When the ejection head 20 reaches a position immediately below the cells S (the ejection areas Z) located at a rearmost end of the mother glass substrate MS in the X direction, the controller 50 operates the X-axis motor driver circuit 52 to stop the X-axis motor MX and the Y-axis motor driver circuit 53 to drive the Y-axis motor MY in such a manner that the mother glass substrate MS starts moving in the Y direction.

Once the mother glass substrate MS starts to move in the Y direction, the controller 50 generates the pattern forming control signals SIa in accordance with the bit map data BD. The controller 50 then outputs the pattern forming control signals SIa and the drive voltage COMa to the head driver circuit 54. Specifically, the controller 50 operates the piezoelectric elements PZ through the head driver circuit 54 in such a manner that, each time the target receiving positions of the cells S reach positions immediately below the ejection head 20, the droplets Fb are ejected from the selected ones of the nozzles N.

At the standby position, the temperature in the proximity of the standby stage 30 is adjusted to the second target temperature, which is the level equal to the temperature in the ejection head 20 and the proximity of the ejection head 20 at the time when the ejection head 20 sequentially ejects the droplets Fb onto the cells S on the mother glass substrate MS. This maintains constant heat balance in the ejection head 20 and the proximity of the ejection head 20 continuously from when the ejection head 20 is located at the standby position to when movement of the stage 13 (the mother glass substrate MS) in the Y direction is started. This maintains the control amount of the controller 50 with respect to the rubber heater driver circuit 55 at a low level, allowing the rubber heater driver circuit 55 to heat the rubber heater H by low power. Thus, by the time ejection is started, the temperature of the liquid crystal F is stably adjusted to the first target temperature in the ejection head 20. Accordingly, the droplets Fb of the liquid crystal F with low viscosity are stably ejected onto those of the cells S onto which the droplets Fb are to be ejected first. This equalizes the amounts of the droplets Fb supplied to the cells S.

When supply of the liquid crystal F (the droplets Fb) to the cells S (the ejection areas Z) located at the rearmost end of the mother glass substrate MS in the X direction is completed, the controller 50 stops the Y-axis motor MY through the Y-axis motor driver circuit 53. Further, the controller 50 operates the X-axis motor driver circuit 52 to drive the X-axis motor MX in such a manner that the ejection head 20 is sent to a position immediately above those of the cells S (the ejection areas Z) located forward from the cells S that have received the liquid crystal F in the X direction.

Once the ejection head 20 reaches the position immediately above the corresponding cells S (the corresponding ejection areas Z), the controller 50 drives the Y-axis motor MY through the Y-axis motor driver circuit 53 in such a manner that the stage 13 is moved in the direction opposite to the Y direction. Once movement of the stage 13 is started, the controller 50 generates the pattern forming control signals SIa in accordance with the bit map data BD and outputs the pattern forming control signals SIa and the drive voltage COMa to the head driver circuit 54. In other words, each time the target receiving positions of the cells S reach the positions immediately below the ejection head 20, the controller 50 operates the head driver circuit 54 to excite the piezoelectric elements PZ in such a manner that the droplets Fb are ejected from the selected ones of the nozzles N.

The above-described operation is then repeatedly carried out until the equal amounts of the liquid crystal F are supplied to all of the cells S on the mother glass substrate MS. In this manner, supply of the liquid crystal F to the cells S on the single mother glass substrate MS is completed. Afterwards, the ejection head 20 is returned to the standby position and held in the standby state until another mother glass substrate MS is set on the stage 13.

At this stage, as has been described, the controller 50 receives the detection signal from the second temperature sensor SE2 and operates the Peltier element driver circuit 56 to drive the Peltier element PT in such a manner that the temperature in the proximity of the standby stage 30 becomes the second target temperature.

The illustrated embodiment has the following advantages.

(1) The temperature in the proximity of the standby stage 30 is adjusted to the predetermined temperature (the second target temperature). This maintains the heat balance in the ejection head 20 and the proximity of the ejection head 20 substantially in a constant state before and after the ejection head 20 is moved from the standby position to the position above the mother glass substrate MS. Thus, at an early stage of ejection of the droplets Fb onto the cells S, the control amount for heating the ejection head 20 is prevented from changing greatly, suppressing changes of the ejection amount caused by a great change of the heat provided to the liquid crystal F at the early stage.

(2) With the temperature in the proximity of the standby stage 30 maintained at the second target temperature, the ejection head 20 is held in the standby state on the standby stage 30. This allows the ejection head 20 to immediately start supplying the liquid crystal F to the cells S on the mother glass substrate MS all by the same amount. As a result, the productivity for manufacturing liquid crystal panels is improved.

(3) The Peltier element PT adjusts the temperature in the proximity of the standby stage 30 (the ejection head 20). In other words, the temperature in the proximity of the standby stage 30 is adjusted to the second target temperature using the single Peltier element PT.

(4) The second target temperature is set in such a manner that the state of the temperature in the ejection head 20 and the proximity of the ejection head 20 when the ejection head 20 is located at the standby position becomes equivalent with such state of the temperature when the ejection head 20 sequentially ejects the droplets Fb onto the cells S on the mother glass substrate MS. Thus, the condition of the ejection head 20 at the standby position becomes significantly similar to the condition of the ejection head 20 when the ejection head 20 ejects the droplets Fb onto the mother glass substrate MS.

A second embodiment of the present invention will now be described with reference to the attached drawings. A droplet ejection apparatus 60 of the second embodiment forms wiring patterns on a plurality of low temperature fired substrates (green sheets), which form a multiple-layer LTCC (low temperature co-fired ceramic) substrate 2.

Figure 7:
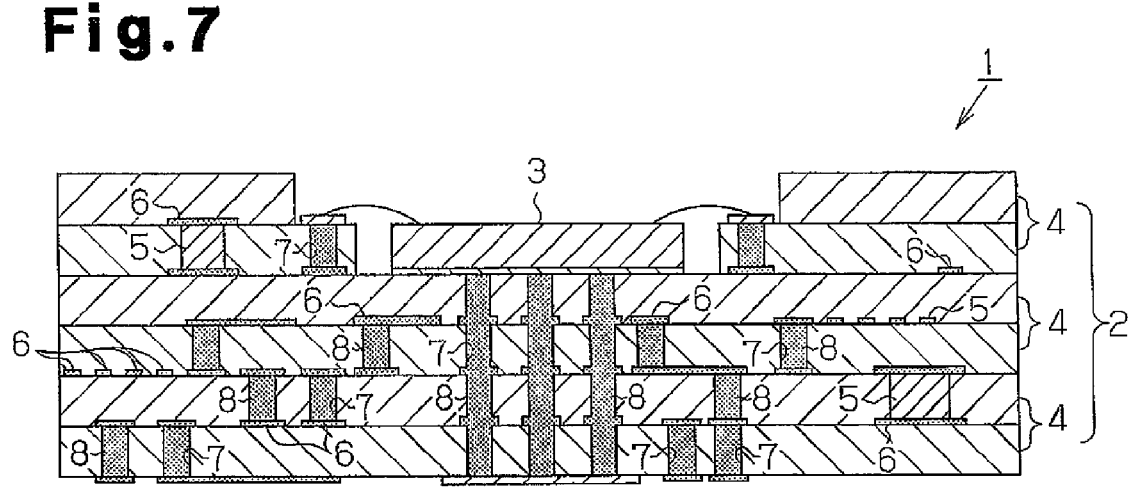
FIG. 7 is a cross-sectional side view showing a circuit module manufactured using a droplet ejection apparatus according to a second embodiment of the present invention.

A circuit module including a semiconductor chip 3 mounted on the LTCC multiple-layer substrate 2 will be first explained. FIG. 7 is a cross-sectional view showing the circuit module 1. The circuit module 1 has the LTCC multiple-layer substrate 2 shaped like a plate and the semiconductor chip 3 connected to the upper side of the LTCC multiple-layer substrate 2 by means of wire bonding.

The LTCC multiple-layer substrate 2 is a laminated body formed by a plurality of low temperature fired substrates 4, each of which is shaped like a sheet. Each of the low temperature fired substrates 4 is a sintered body of formed glass ceramic material (for example, a mixture of a glass element such as borosilicate alkaline oxide and a ceramic element such as alumina). The thickness of each low temperature fired substrate 4 is several hundreds of micrometers. In other words, the low temperature fired substrate 4 is a porous substrate.

Figure 8:
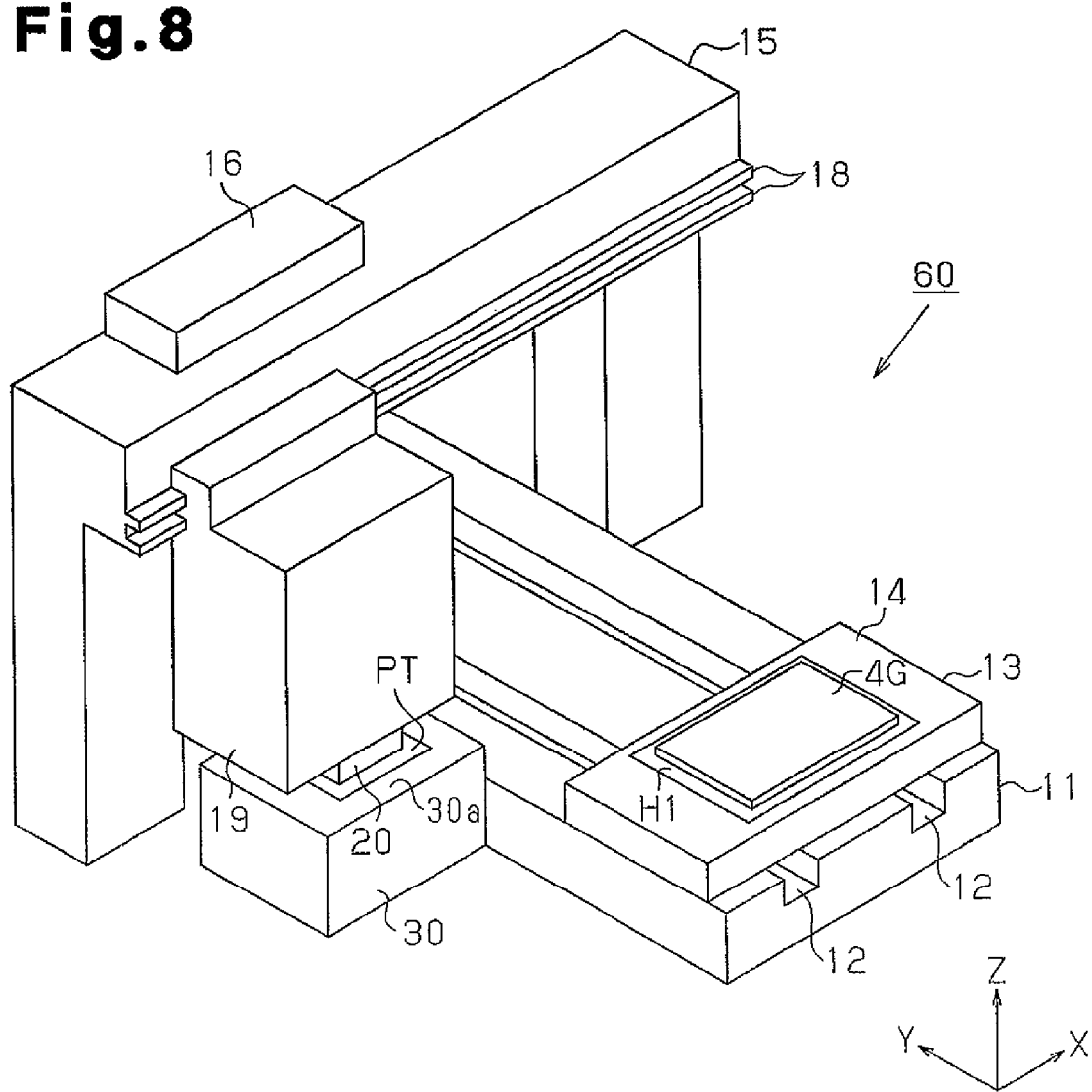
FIG. 8 is a perspective view showing the ejection apparatus according to the second embodiment.

Each low temperature fired substrate 4 that is yet to be sintered is referred to as a green sheet 4G (see FIG. 8). The green sheet 4G is prepared using slurry formed by mixing powders of the glass ceramic material with dispersion medium along with a binder and a foaming agent. The slurry is shaped like a plate and then dried to form the green sheet 4G. In the illustrated embodiment, the green sheet 4G is air-permeable.

Each low temperature fired substrate 4 has various circuit elements 5 such as a resistance element, a capacity element, and a coil element, internal wires 6, a plurality of via holes 7, and via wires 8, which are provided according to a circuit design. The internal wires 6 electrically connect the circuit elements 5 together. Each of the via holes 7 has a stacked via structure or a thermal via structure and a predetermined diameter. The via wires 8 are fitted in the corresponding via holes 7.

Each of the internal wires 6 of the low temperature fired substrates 4 is a sintered body formed of metal particles of silver or silver alloy and provided using the droplet ejection apparatus 60, which is shown in FIG. 8.

FIG. 8 is a perspective view showing the droplet ejection apparatus 60 as a whole. Same or like reference numerals are given to components of the second embodiment that are the same as or like corresponding components of the droplet ejection apparatus 10 of the first embodiment and detailed explanation of these components will be omitted herein. The following description thus focuses on the differences in configuration between the first embodiment and the second embodiment.

As illustrated in FIG. 8, the low temperature fired substrate 4 (the green sheet 4G), which is a substrate to be sintered, is mounted on the mounting portion 14, or the upper surface of the stage 13. The mounting portion 14 positions and fixes the green sheet 4G with respect to the stage 13. The stage 13 transports the green sheet 4G in the Y direction and the opposite direction to the Y direction. A rubber heater H1, which forms a third temperature regulating section, is arranged on the upper surface of the stage 13. The green sheet 4G on the mounting portion 14 is heated to a predetermined temperature (a third target temperature) by the rubber heater H1, the upper surface of which as a whole forms the third temperature regulating section.

The ink tank 16, which is provided on the guide member 15, retains metal ink MF (see FIG. 9), or liquefied material, and supplies the metal ink MF to the ejection head 20 under a predetermined pressure. The metal ink MF is then ejected from the ejection head 20 onto the green sheet 4G, which is located immediately below the ejection head 20, as droplets Fb.

The metal ink MF is a dispersed type metal ink formed by dispersing metal particles, which is functional material, in a solvent. The metal particles contained in the metal ink MF may have a diameter of, for example, several nanometers.

The metal particles are particles of material such as gold (Au), silver (Ag), copper (Cu), aluminum (Al), palladium (Pd), manganese (Mn), titanium (Ti), tantalum (Ta), and nickel (Ni) or oxides or superconductors thereof. The diameter of each of the metal particles is preferably not less than 1 nm and not more than 0.1 μm. If the diameter of each metal particle is more than 0.1 μm, clogging may occur in the ejection nozzles N of the ejection head 20. If the diameter of each metal particle is less than 1 nm, the volume ratio of the dispersion medium with respect to the metal particles increases and the proportion of the organic matter in an obtained film becomes excessively great.

The dispersion medium is not restricted to any specific type as long as the above-listed metal particles are dispersed by the dispersion medium. The dispersion medium may be:—for example, a water based solvent; an alcohol such as methanol, ethanol, propanol, or butanol; a carbon hydride compound such as n-heptane, n-octane, decane, dodecane, tetradecane, toluene, xylene, cymene, durene, indene, dipentene, tetrahydronaphthalene, decahydronaphthalene, or cyclohexylbenzene; a polyol such as ethylene glycol, diethylene glycol, triethylene glycol, glycerin, or 1,3-propanediol; an ether compound such as polyethylene glycol, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, 1,2-dimethoxy ethane, bis(2-methoxy ethyl)ether, or p-dioxane; or a polar compound such as propylenecarbonate, γ-butyrolactone, N-methyl-2-pyrrolidone, dimethylformamide, dimethylsulfoxide, cyclohexanone, or ethyl lactate. To ensure sufficient dispersion performance of the particles, stability of dispersion liquid, and easy application of use of the liquid to the droplet ejection method, the dispersion medium is preferably water, alcohol, carbon hydride type compound, or ether compound and, more preferably, water or carbon hydride compound.

Heating of the green sheet 4G promotes evaporation of the solvent or the dispersion medium from the metal ink MF that has been received by the green sheet 4G. As the metal ink MF dries on the green sheet 4G, the viscosity of the metal ink MF increases from the outer end of the surface of the metal ink MF. Specifically, the concentration of the solid content (the particles) of the metal ink MF in the outer circumferential portion of the surface of the metal ink MF quickly reaches the saturation level compared to that in the central portion of the surface. Thus, the viscosity of the metal ink MF increases rapidly in the outer end of the surface of the metal ink MF compared to the central portion of the surface. As the viscosity of the metal ink MF increases, the metal ink MF stops spreading wet along the direction of the surface of the green sheet 4G (this is referred to as pinning). In the pinned state, the metal ink MF is fixed to the green sheet 4G and the outer diameter of the droplet Fb is also fixed. This prevents a subsequently ejected droplet Fb from being attracted by the droplet Fb, which has been previously ejected onto the green sheet 4G.

Figure 9:
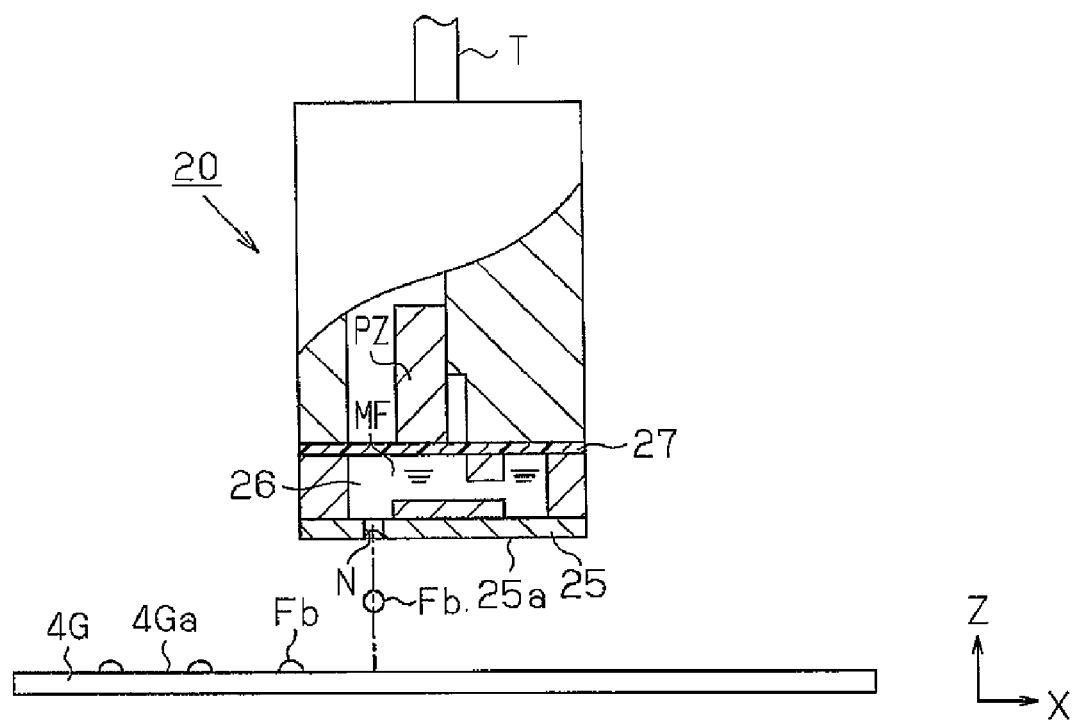
FIG. 9 is a partial cross-sectional side view showing a droplet ejection head of the ejection apparatus shown in FIG. 8.

With reference to FIG. 9, the ejection head 20 of the second embodiment includes neither the rubber heater H nor the first temperature sensor SE1, unlike the ejection head 20 of the first embodiment.

As illustrated in FIG. 8, a recess is formed in the top surface 30a of the standby stage 30. The Peltier element PT, which functions as a fourth temperature regulating section, is arranged in the recess in a state flush with the top surface 30a. In the second embodiment, the position of the standby stage 30 is adjusted in such a manner that the interval between the nozzle plate 25 of the ejection head 20 and the top surface 30a of the standby stage 30 (the Peltier element PT) becomes equal to the interval between the nozzle plate 25 and the green sheet 4G mounted on the stage 13.

The Peltier element PT regulates the state of the temperature in the ejection head 20 and the proximity of the ejection head 20 through adjustment of the temperature in the proximity of the standby stage 30 when the ejection head 20 is arranged at the standby position. Specifically, the Peltier element PT operates in such a manner that the temperature in the proximity of the standby stage 30 becomes a predetermined temperature (a fourth target temperature). The fourth target temperature is set to a level that allows the state of the temperature in the ejection head 20 and the proximity of the ejection head 20 when the ejection head 20 is arranged at the standby position to be equivalent with the state of the temperature in the ejection head 20 and the proximity of the ejection head 20 when the ejection head 20 sequentially ejects the droplets Fb onto the green sheet 4G. The fourth target temperature is determined through experiments, tests, or calculations.

The electric configuration of the droplet ejection apparatus 60 will be explained with reference to FIG. 10.

Figure 10:
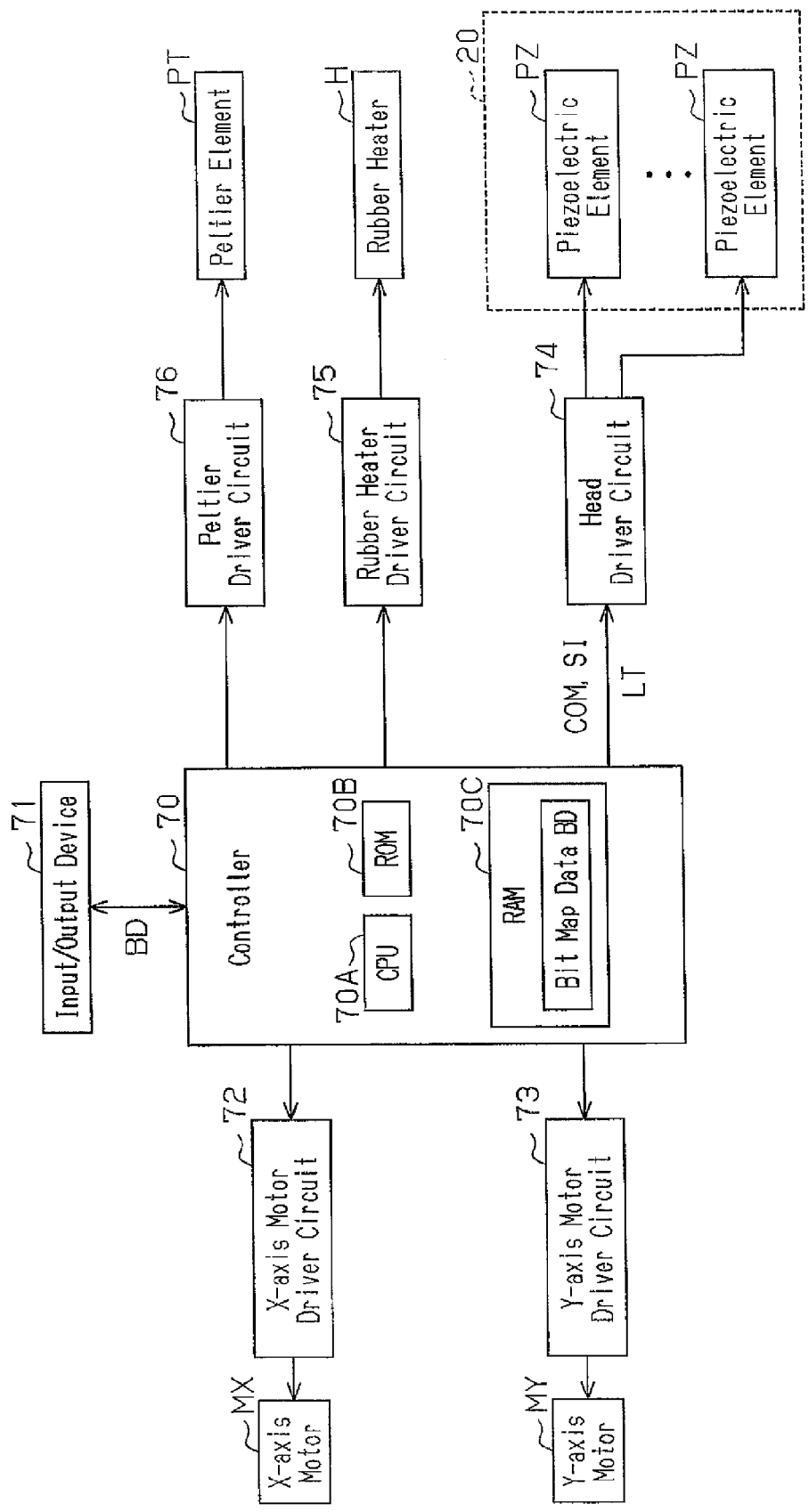
FIG. 10 is a block circuit diagram representing the electric configuration of the election apparatus shown in FIG. 8.

With reference to FIG. 10, the droplet ejection apparatus 60 includes a controller 70 serving as the third temperature regulating section and the fourth temperature regulating section. The controller 70 includes a CPU 70A, a ROM 70B, and a RAM 70C. The controller 70 executes a transport procedure of the stage 13, a transport procedure of the carriage 19, a droplet ejection procedure of the ejection head 20, a driving procedure of the rubber heater H, and an operating procedure of the Peltier element PT, in accordance with various types of data and control programs stored in the RON 70B and the RAM 70C.

An input/output device 71 having different types of manipulation switches and a display is connected to the controller 70. The input/output device 71 displays the states of the procedures carried out by the droplet ejection apparatus 60. The input/output device 71 generates bit map data BD in accordance with which the internal wires 6 are formed and outputs the bit map data BD to the controller 70.

The bit map data BD is data used for instructing to turn on or off the respective piezoelectric elements PZ in correspondence with the associated bit values (0 or 1). In accordance with the bit map data BD, it is determined whether to eject a droplet Fb for wiring onto a respective one of positions on an ejection plane (the ejection target surface 4Ga) over which the ejection head 20 passes (the nozzles N pass). In other words, the bit map data BD is data that ensures ejection of droplets FE for wiring onto target positions for forming the internal wires 6 defined on the ejection target surface 4Ga.

An X-axis motor driver circuit 72 is connected to the controller 70. The controller 70 provides a drive control signal to the X-axis motor driver circuit 72. In response to the drive control signal from the controller 70, the X-axis motor driver circuit 72 operates to rotate an X-axis motor MX, which drives the carriage 19, in a forward direction or a reverse direction. A Y-axis motor driver circuit 73 is connected to the controller 70 The controller 70 provides a drive control signal to the Y-axis motor driver circuit 73. In response to the drive control signal from the controller 70, the Y-axis motor driver circuit 73 operates to rotate a Y-axis motor MY, which drives the stage 13, in a forward direction or a reverse direction.

A head driver circuit 74 is connected to the controller 70. The controller 70 outputs an ejection timing signal LT synchronized with a predetermined ejection frequency to the head driver circuit 74. The controller 70 also provides drive voltage COM that drives the piezoelectric elements PZ to the head driver circuit 74 synchronously with the ejection frequency.

The controller 70 generates pattern forming control signals SI synchronized with a predetermined frequency in accordance with the bit map data BD and serially transfers the pattern forming control signals SI to the head driver circuit 74. The head driver circuit 74 sequentially converts the pattern forming control signals SI, which have been provided by the controller 70, from serial forms to parallel forms in correspondence with the piezoelectric elements PZ. Further, each time the head driver circuit 74 receives the ejection timing signal LT from the controller 70, the head driver circuit 74 latches the pattern forming control signals SI that have been converted into the parallel forms. The head driver circuit 74 thus supplies the drive voltage COM to those of the piezoelectric elements PZ that are selected in correspondence with the pattern forming control signals SI.

A rubber heater driver circuit 75, which forms the third temperature regulating section, is connected to the controller 70. The controller 70 outputs a drive control signal to the rubber heater driver circuit 75. In response to the drive control signal from the controller 70, the rubber heater driver circuit 75 controls operation of the rubber heater H1. The rubber heater H1 heats the green sheet 4G mounted on the stage 13 to the predetermined third target temperature.

In the second embodiment, the third target temperature is set to a level not less than the temperature of the metal ink MF at the time when the metal ink MF is ejected from the ejection head 20 and less than the boiling point (the lowest boiling point) of the liquid composition contained in the metal ink MF.

The controller 70 operates in such a manner that the temperature of the green sheet 4G becomes the third target temperature through the rubber heater driver circuit 75. Thus, after having been received by the green sheet 4G, the droplets Fb are rapidly heated and dried without bumping.

A Peltier element driver circuit 76, which forms the fourth temperature regulating section, is connected to the controller 70. The controller 70 sends a drive control signal to the Peltier element driver circuit 76. In response to the drive control signal from the controller 70, the Peltier element driver circuit 76 controls operation of the Peltier element PT. The Peltier element PT adjusts the temperature in the proximity of the standby stage 30 to the fourth target temperature. That is, the controller 70 controls operation of the Peltier element PT in such a manner that the temperature in the proximity of the standby stage 30 (in other words, the temperature in the proximity of the ejection head 20 located at the standby position) becomes the fourth target temperature.

As a result, the heat balance in the ejection head 20 and the proximity of the ejection head 20 when the ejection head 20 is held in the standby state becomes equivalent with the heat balance in the ejection head 20 and the proximity of the ejection head 20 at the time when the ejection head 20 ejects the droplets Fb onto the green sheet In other words, the rubber heater driver circuit 75 heats the rubber heater H1 by the output (the power) equal to the power produced by the rubber heater driver circuit 75 when the droplets Fb are ejected onto the green sheet 4G in such a manner that the temperature of the rubber heater H1 becomes the third target temperature.

A method for forming a wiring pattern on the green sheet 4G using the droplet ejection apparatus 60 will hereafter be explained.

As illustrated in FIG. 8, the green sheet 4G is mounted on the stage 13 with the ejection target surface 4Ga facing upward. In this state, the stage 13 is located rearward from the carriage 19 in the Y direction. The droplet ejection apparatus 60 forms the wiring pattern of the internal wires 6 on the ejection target surface 4Ga of the green sheet 4G on which the via holes 7 and the via wires 8 have been formed in advance.

The bit map data BD is input to the controller 70 through the input/output device 71. In other words, the controller 70 stores the bit map data BD provided through the input/output device 71. At this stage, the controller 70 drives the rubber heater H1 through the rubber heater driver circuit 75 in such a manner that the entire green sheet 4G mounted on the stage 13 is heated uniformly to the third target temperature.

The controller 70 then operates the Peltier element PT through the Peltier element driver circuit 76 in such a manner that the temperature in the proximity of the ejection head 20, which is arranged at the standby position, becomes the fourth target temperature. As a result, the heat balance in the ejection head 20 and the proximity of the ejection head 20 in the standby state becomes equivalent with the heat balance in the ejection head 20 and the proximity of the ejection head 20 at the time when the ejection head 20 ejects the droplets Fb onto the green sheet 4G.

Further, the controller 70 drives the Y-axis motor MX through the Y-axis motor driver circuit 73 to transport the stage 13 in such a manner that the ejection head 20 moves in the Y direction and passes the position immediately above the green sheet 4G. The controller 70 then drives the X-axis motor MX through the X-axis motor driver circuit 72 to start movement of the ejection head 20.

Once the ejection head 20 starts to move, the controller 70 generates the pattern forming control signals SI in accordance with the bit map data BD. The controller 70 then outputs the pattern forming control signals SI and the drive voltage COM to the head driver circuit 74. Specifically, the controller 70 operates the piezoelectric elements PZ through the head driver circuit 74 in such a manner that, each time the receiving positions at which the internal wires 6 are to be formed reach positions immediately below the ejection head 20, the droplets Fb are ejected from the selected ones of the nozzles N.

At the standby position, the temperature in the proximity of the standby stage 30 (the ejection head 20) is adjusted to the fourth target temperature, which is the level equal to the temperature in the ejection head 20 and the proximity of the ejection head 20 at the time when the ejection head 20 sequentially ejects the droplets Fb onto the green sheet 4G. This maintains constant heat balance in the ejection head 20 and the proximity of the ejection head 20 continuously from when the ejection head 20 is located at the standby position to when movement of the stage 13 (the green sheet 4G) in the Y direction is started. As a result, the control amount of the controller 50 with respect to the rubber heater driver circuit 75 is limited to a low level. The rubber heater driver circuit 75 thus heats the rubber heater H1 by low power. Thus, by the time ejection is started, the temperature of the metal ink MF is adjusted to the temperature of the metal ink MF when the droplets Fb are ejected onto the green sheet 4G. The viscosity of the metal ink MF is also lowered. Accordingly, the ejection head 20 stably ejects a first set of the droplets Fb, equalizing the amounts of the droplets Fb supplied to the green sheet 4G.

Since the green sheet 4G has been heated to the fourth target temperature, the droplets Fb rapidly become dry on the green sheet 4G. As a result, the droplets Fb on the green sheet 4G are dried without being displaced from the corresponding receiving positions. The wiring pattern of the internal wires 6 is thus provided.

Also, the air permeability of the green sheet 4G promotes quick drying of the droplets Fb, thus fixing the droplets Fb. The following droplets Fb to be received by the green sheet 4G are thus ejected at an earlier timing. This shortens the time needed for forming the wiring pattern of the internal wires 6. Further, since the temperature (the third target temperature) of the green sheet 4G is controlled to the level less than the boiling point of each droplet Fb, the ejected droplets Fb do not bump. As a result, the wiring pattern is reliably formed.

After the ejection head 20 has moved from one end of the green sheet 4G to the other, the controller 70 operates in such a manner that the droplets Fb are ejected onto the following portions of the green sheet 4G at which the internal wires 6 are to be formed. Specifically, the controller 70 drives the Y-axis motor MY through the Y-axis motor driver circuit 73 to transport the stage 13 in the Y direction by a predetermined distance and then moves the ejection head 20 in the opposite direction to the X direction.

Once movement of the ejection head 20 has started, the controller 70 excites the piezoelectric elements PZ through the head driver circuit 74 in accordance with the bit map data BD. In this manner, each time the receiving positions at which the internal wires 6 are to be formed reach the positions immediately below the ejection head 20, the controller 70 operates to eject the droplets Fb from the selected ones of the nozzles N. Also in this case, drying of the droplets Fb that have been previously received by the green sheet 4G is started quickly and the droplets Fb are thus dried rapidly, as in the above-described case.

Afterwards, similar operation is repeated until the wiring pattern of the internal wires 6 is provided on the green sheet 4G.

Once formation of the wiring pattern of the internal wires 6 on the green sheet 4G is completed, the controller 70 operates the carriage 19 (the X-axis motor MX) in such a manner that the ejection head 20 is sent to and temporarily held at the standby position. After the ejection head 20 stops at the standby position, the controller 70 drives the Peltier element PT in such a manner that the temperature in the proximity of the ejection head 20, which is held at the standby position, becomes the fourth target temperature. In this state, a subsequent green sheet 4G may be subjected to formation of a wiring pattern of internal wires 6.

That is, each time formation of the wiring pattern is completed on any one of the green sheets 4G, the ejection head 20 is temporarily stopped at the standby position and the temperature in the proximity of the ejection head 20, which is held at the standby position, is adjusted by the Peltier element PT.

The second embodiment has the following advantages.

(1) In the second embodiment, prior to ejection of the droplets Fb of the metal ink MF onto the green sheet 4G that has been heated to the third target temperature, the first temperature regulating section (the Peltier element PT) adjusts the temperature in the proximity of the droplet ejection head 20, which is located at the standby position, to the fourth target temperature. The fourth target temperature is equal to the temperature in the proximity of the droplet ejection head 20 at the time when the droplet ejection head 20 ejects the droplets Fb onto the green sheet 4G.

This prevents the heat balance in the ejection head 20 and the proximity of the ejection head 20 from changing greatly before and after the droplet ejection head 20 moves from the standby position to the position corresponding to the green sheet 4G. Thus, at an early stage of supply of the droplets Fb, great change of the control amount of the rubber heater H1, which heats the green sheet 4G, is suppressed. This reduces change of the temperature of the green sheet 4G at the early stage. Also, the ejection amount is prevented from being altered by change of the temperature of the metal ink MF in the ejection head 20.

(2) In the second embodiment, the green sheet 4G is heated to a temperature not less than the temperature of the metal ink MF at the time when the metal ink MF is ejected from the ejection head 20. This rapidly heats and dries the droplets Fb that have been received by the green sheet 4G. As a result, the following droplets Fb to be received by the green sheet 4G are ejected at an earlier timing. The wiring pattern is thus formed in a short time.

(3) In the second embodiment, the temperature of the green sheet 4G is regulated to a temperature lower than the boiling point of the droplets Fb. This prevents the droplets Fb from bumping on the green sheet 4G. The droplet ejection apparatus 60 thus forms a high-density and high-precision wiring pattern.

The illustrated embodiments may be modified in the following forms.

In the first embodiment, the second temperature regulating section may be any suitable device (for example, a rubber heater) other than the Peltier element PT.

In the second embodiment, the fourth temperature regulating section may be any suitable device (for example, a rubber heater) other than the Peltier element PT.

In the first embodiment, the second target temperature may be the temperature of the mother glass substrate MS that is mounted on the stage 13.

In the first embodiment, the first temperature regulating section may be any suitable device (for example, a heat generating portion of a Peltier element) other than the rubber heater H.

In the second embodiment, the third temperature regulating section may be any suitable device (for example, a heat generating portion of a Peltier element) other than the rubber heater H1.

In the first embodiment, the first target temperature is not restricted to 70° C. but may be any suitable value as long as the viscosity of the liquid crystal F becomes sufficiently high for the liquid crystal F to be ejected from the ejection head 20 at the first target temperature.

In the second embodiment, the droplet ejection apparatus 60 may further include a temperature sensor that detects the temperature in the proximity of the standby stage 30. In correspondence with the temperature in the proximity of the standby stage 30 detected by the temperature sensor, the droplet ejection apparatus 60 performs feedback control in such a manner that the temperature in the proximity of the standby stage 30 becomes the fourth target temperature.

In the second embodiment, the droplet ejection apparatus 60 may further include a temperature sensor that detects the temperature of the green sheet 4G. The droplet ejection apparatus 60 performs feedback control on the temperature of the green sheet 4G in correspondence with the temperature detected by the temperature sensor.

The ejection head 20 may be moved with the stage 13 (the mother glass substrate MS or the green sheet 4G) held in a stopped state and then allowed to eject the droplets Fb.

In the first embodiment, although the liquefied material is embodied by the liquid crystal F, the liquefied material is not restricted to this. The liquefied material may be a substance used in, for example, formation of a resist, an interlayer film, or a wiring layer on a substrate. Further, the formation of these different types of elements using the liquefied material may be performed on a different type of display other than the liquid crystal display, which is, for example, an organic EL display.

The ejection member is embodied by the ejection head 20, which is a piezoelectric drive type. However, the ejection head 20 may be a resistance heating type or an electrostatic drive type.

What is claimed is:

1. A method for ejecting a liquefied material from an ejection member onto a substrate, the method comprising:
    detecting a temperature of the liquefied material in the ejection member with a first temperature detector;
    adjusting the temperature of the liquefied material in the ejection member to a first target temperature with a first temperature regulating element secured to a surface of the ejection member;
    detecting a temperature of a standby stage with a second temperature detector that is different from the first temperature detector, wherein the standby stage is arranged to oppose the ejection member when the ejection member is held in a standby state;
    adjusting the temperature of the standby stage with a second temperature regulating element mounted in the standby stage to a second target temperature so that a temperature in a proximity of the ejection member when the ejection member is held in the standby state on the standby stage is substantially equal to the temperature in the proximity of the ejection member when the ejection member ejects the liquefied material onto the substrate, wherein the first target temperature is different from the second target temperature; and
    moving the ejection member from the standby position to a position at which the substrate is located, thereby performing ejection of the liquefied material onto the substrate;

2. The method according to claim 1, wherein the liquefied material is a liquid crystal, and wherein the ejection member ejects the liquid crystal onto the substrate to form a liquid crystal panel.

3. The method according to claim 1, wherein the liquefied material is a metal ink, and wherein the ejection member ejects the metal ink onto the substrate to form a wiring pattern on a surface of the substrate.

4. The method according to claim 1, wherein the first temperature detector is located at a different location than the second temperature detector.

5. The method according to claim 1, wherein the first temperature detector is located on the ejection member and the second temperature detector is located on the standby stage.

6. The method according to claim 1, wherein the first temperature regulating element comprises a rubber heater, wherein the rubber heater adjusts the temperature in the ejection member.

7. The method according to claim 1, wherein the second temperature regulating element comprises a Peltier element, wherein the Peltier element adjusts the temperature in an area in the proximity of the ejection member.

8. The method according to claim 1, wherein an area in the proximity of the ejection member comprises the standby stage.

* * * * *